(12) United States Patent
Yamamoto (10) Patent No.: US 10,611,362 B2
(45) Date of Patent: Apr. 7, 2020

(54) VEHICLE INCLUDING TRAVELING MOTOR

(71) Applicant: Toyota Jidosha Kabushiki Kaisha, Toyota-shi, Aichi-ken (JP)

(72) Inventor: Masaya Yamamoto, Owariasahi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/444,643

(22) Filed: Feb. 28, 2017

(65) Prior Publication Data
US 2017/0253230 A1 Sep. 7, 2017

(30) Foreign Application Priority Data
Mar. 2, 2016 (JP) .................................. 2016-040483

(51) Int. Cl.
*B60W 20/14* (2016.01)
*B60L 7/18* (2006.01)
(Continued)

(52) U.S. Cl.
CPC ............... *B60W 20/14* (2016.01); *B60K 6/26* (2013.01); *B60K 6/52* (2013.01); *B60L 7/14* (2013.01); *B60L 7/18* (2013.01); *B60L 7/26* (2013.01); *B60L 50/16* (2019.02); *B60L 50/61* (2019.02); *B60L 58/12* (2019.02); *B60W 2510/244* (2013.01); *B60W 2710/08* (2013.01); *B60W 2710/18* (2013.01); *B60Y 2300/18125* (2013.01); *B60Y 2300/91* (2013.01); *B60Y 2400/112* (2013.01); *B60Y 2400/73* (2013.01); *Y02T 10/6217* (2013.01); *Y02T 10/7005* (2013.01); *Y02T 10/705* (2013.01);
(Continued)

(58) Field of Classification Search
CPC ...................................................... B60W 20/14
See application file for complete search history.

(56) References Cited

U.S. PATENT DOCUMENTS

2004/0210356 A1* 10/2004 Wilton .................. B60L 3/0046
701/22
2005/0252701 A1* 11/2005 Shimizu ............... B60K 17/356
180/65.1

(Continued)

FOREIGN PATENT DOCUMENTS

| JP | 2006-141097 A | 6/2006 |
|---|---|---|
| JP | 2011-219039 A | 11/2011 |
| JP | 2015-214265 A | 12/2015 |

*Primary Examiner* — Imran K Mustafa
(74) *Attorney, Agent, or Firm* — Dinsmore & Shohl LLP (57) ABSTRACT

When a braking request is made while a SOC recovery switch is turned off, regeneration driving of a rear wheel motor is prohibited. In this case, a front wheel motor, the rear wheel motor, and an oil hydraulic brake device are controlled such that requested braking torque is exerted on a vehicle with regenerative driving of the front wheel motor and without regenerative driving of the rear wheel motor. When the braking request is made while the SOC recovery switch is turned on, the regeneration driving of the rear wheel motor is permitted. In this case, the front wheel motor, the rear wheel motor, and the oil hydraulic brake device are controlled such that the requested braking torque is exerted on the vehicle with regenerative driving of the front wheel motor and the rear wheel motor.

4 Claims, 6 Drawing Sheets

(51) Int. Cl.
*B60K 6/52* (2007.10)
*B60K 6/26* (2007.10)
*B60L 7/14* (2006.01)
*B60L 7/26* (2006.01)
*B60L 50/16* (2019.01)
*B60L 58/12* (2019.01)
*B60L 50/61* (2019.01)

(52) U.S. Cl.
CPC ........ *Y02T 10/7044* (2013.01); *Y02T 10/7077* (2013.01); *Y02T 10/92* (2013.01); *Y10S 903/93* (2013.01)

(56) References Cited

U.S. PATENT DOCUMENTS

2008/0314661 A1* 12/2008 Soliman ................ B60W 10/18
  180/65.245
2014/0343816 A1* 11/2014 Onoda ................ B60T 8/17552
  701/70

* cited by examiner

VEHICLE INCLUDING TRAVELING MOTOR

CROSS-REFERENCE TO RELATED APPLICATIONS

This application claims priority to Japanese Patent Application No. 2016-040483 filed on Mar. 2, 2016 incorporated herein by reference in its entirety.

BACKGROUND

1. Technical Field

The present disclosure relates to vehicles including a traveling motor, and more particularly relates to a vehicle including a first motor, a second motor, a battery, and an instruction switch.

2. Description of Related Art

As a vehicle of this type, there has conventionally been proposed a vehicle including an engine, a first motor-generator configured to generate electric power by using motive power from the engine, a second motor-generator for traveling, a battery configured to exchange electric power with the first motor-generator and the second motor-generator, and a state of charge (SOC) recovery switch (see, for example, Japanese Patent Application Publication No. 2015-214265). While the SOC recovery switch of the vehicle is turned on, intermittent operation of the engine is prohibited (engine operation stop is prohibited) when a requested regeneration level requested by a user is equal to or less than a specified level, i.e., when regenerative power of the second motor-generator during deceleration of the vehicle becomes equal to or less than a threshold. As a consequence, the battery can be charged with electric power generated by the first motor-generator using the motive power front the engine, so that the state of charge of the battery can be restored. While the SOC recovery switch is turned on, intermittent operation of the engine is permitted (engine stop is permitted) when the requested regeneration level is higher than the specified level, i.e., when the regenerative power of the second motor-generator during deceleration of the vehicle becomes larger than the threshold. Accordingly, it becomes possible to reduce fuel consumption by the engine and to charge the battery with the regenerative power of the second motor-generator, so that the state of charge of the battery can be recovered.

SUMMARY

In recent years, a vehicle including a traveling motor has been proposed. The vehicle includes a first motor connected to one of front wheels and rear wheels, a second motor connected to the other of the front wheels and the rear wheels, and a battery configured to exchange electric power with the first motor and the second motor, the first motor being used as a main motor, the second motor being used as a sub motor. In such a vehicle, a motor having a relatively small thermal capacity is often used as the second motor, or a cooling device having a relatively low cooling capacity is often used to cool the second motor. Accordingly, it is required to take appropriate actions in consideration that the second motor tends to be overheated and whether the aforementioned SOC recovery switch is turned on or off (whether the driver instructs recovery of the SOC of the battery).

Accordingly, the present disclosure provides a vehicle configured to execute more appropriate control of a motor mounted thereon, corresponding to whether an instruction switch that instructs recovery of the SOC of a battery is turned on or off.

According to one aspect of the present disclosure, there is provided a vehicle including a first motor, a second motor, a battery, a braking force applying unit, an instruction switch, and electronic control units. The first motor is connected to one of front wheels and rear wheels. The second motor is connected to an other of the front wheels and the rear wheels. The battery is configured to exchange electric power with the first motor and the second motor. The braking force applying unit is configured to apply braking force to the vehicle. The instruction switch is configured to instruct recovery of a state of charge of the battery. The electronic control units are configured to: (i) when a braking request is made in the vehicle, control the first motor, the second motor, and the braking force applying unit such that requested braking force corresponding to the braking request is exerted on the vehicle, (ii) when the braking request is made while the instruction switch is turned off, execute control such that the first motor is regeneratively driven while the second motor is not regeneratively driven, and (iii) when the braking request is made while the instruction switch is turned on, execute control such that the first motor and the second motor are regeneratively driven.

In the vehicle as described above, when a braking request is made, the first motor, the second motor, and the braking force applying unit are controlled such that requested braking force corresponding to the braking request is exerted on the vehicle. When the braking request is made while the instruction switch is turned off, control is executed such that the first motor is regeneratively driven while the second motor is not regeneratively driven. When the braking request is made while the instruction switch is turned on, control is executed such that the first motor and the second motor are regeneratively driven. With such control, when a braking request is made while the instruction switch is turned off, it becomes possible to suppress temperature rise in the second motor and to thereby prevent the second motor from being overheated as compared with when the second motor is regeneratively driven. As a result, it becomes possible to prevent drive restriction from being imposed on the second motor, so that performance of the second motor can sufficiently be demonstrated on the occasions when the second motor needs to be driven, such as when a turn is made and when a slip occurs in later time. When a braking request is made while the instruction switch is turned on, maximum electric power feedable to the battery can be increased as compared with when the second motor is not regeneratively driven. Moreover, the sum of a loss of the first motor and a loss of the second motor changes in proportion to a square of a torque (current) of the first motor or the second motor. Accordingly, it can basically be considered (in most regions with respect to the requested braking force) that when the first motor and the second motor are regeneratively driven to exert certain braking force on the vehicle, the sum of the loss of the first motor and the loss of the second motor can be reduced and energy efficiency of the vehicle can be enhanced as compared with the case of exerting the certain braking force on the vehicle with regenerative driving of the first motor without regenerative drive of the second motor. As a result, the state of charge of the battery can be recovered (increased) more.

In the vehicle, the electronic control units may be configured to execute control such that a sum of a loss of the first motor and a loss of the second motor is minimum when the braking request is made while the instruction switch is turned on. As a consequence, energy efficiency of the vehicle can be enhanced more. Here, "a sum of a loss of first motor and a loss of the second motor is minimum" means that the sum of the loss of the first motor and the loss of the second motor is minimum within the range where the respective motors can be driven. For example, when a drive restriction is imposed on one of the first motor and the second motor due to overheating and the like, the above phrase means that the sum of the loss of the first motor and the loss of the second motor is minimum within the drive-restricted range.

In the vehicle, the electronic control units may be configured to: (i) execute control such that the requested braking force is exerted on the vehicle from the first motor when the requested braking force is equal to or less than first maximum braking force exertable on the vehicle from the first motor, when the braking request is made while the instruction switch is turned off, (ii) execute control such that the first maximum braking force is exerted on the vehicle from the first motor and that braking force of a difference between the requested braking force and the first maximum braking force is exerted on the vehicle from the braking force applying unit when the requested braking force is larger than the first maximum braking force and the braking request is made while the instruction switch is turned off, (iii) execute control such that the requested braking force is exerted on the vehicle from the first motor and the second motor when the requested braking force is equal to or less than second maximum braking force that is exertable on the vehicle from the first motor and the second motor and the braking request is made while the instruction switch is turned on, and (iv) execute control such that the second maximum braking force is exerted on the vehicle from the first motor and the second motor and that braking force of a difference between the requested braking force and the second maximum braking force is exerted on the vehicle from the braking force applying unit when the requested braking force is larger than the second maximum braking force and the braking request is made while the instruction switch is turned on. Accordingly, relatively large electric power can be supplied to the battery.

Furthermore, in the vehicle, the electronic control units may be configured to, when the braking request is made while the instruction switch is turned on, execute control such that the first motor is regeneratively driven while the second motor is not regeneratively driven when the braking request is made while the instruction switch is turned on and a sum of a loss of the first motor and a loss of the second motor when only the first motor is driven is smaller than the sum when than the first motor and the second motor are regeneratively driven. As a consequence, energy efficiency of the vehicle can be enhanced more.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A description is now given of a mode for carrying out the present disclosure (embodiment) with reference to the drawings.

Figure 1:
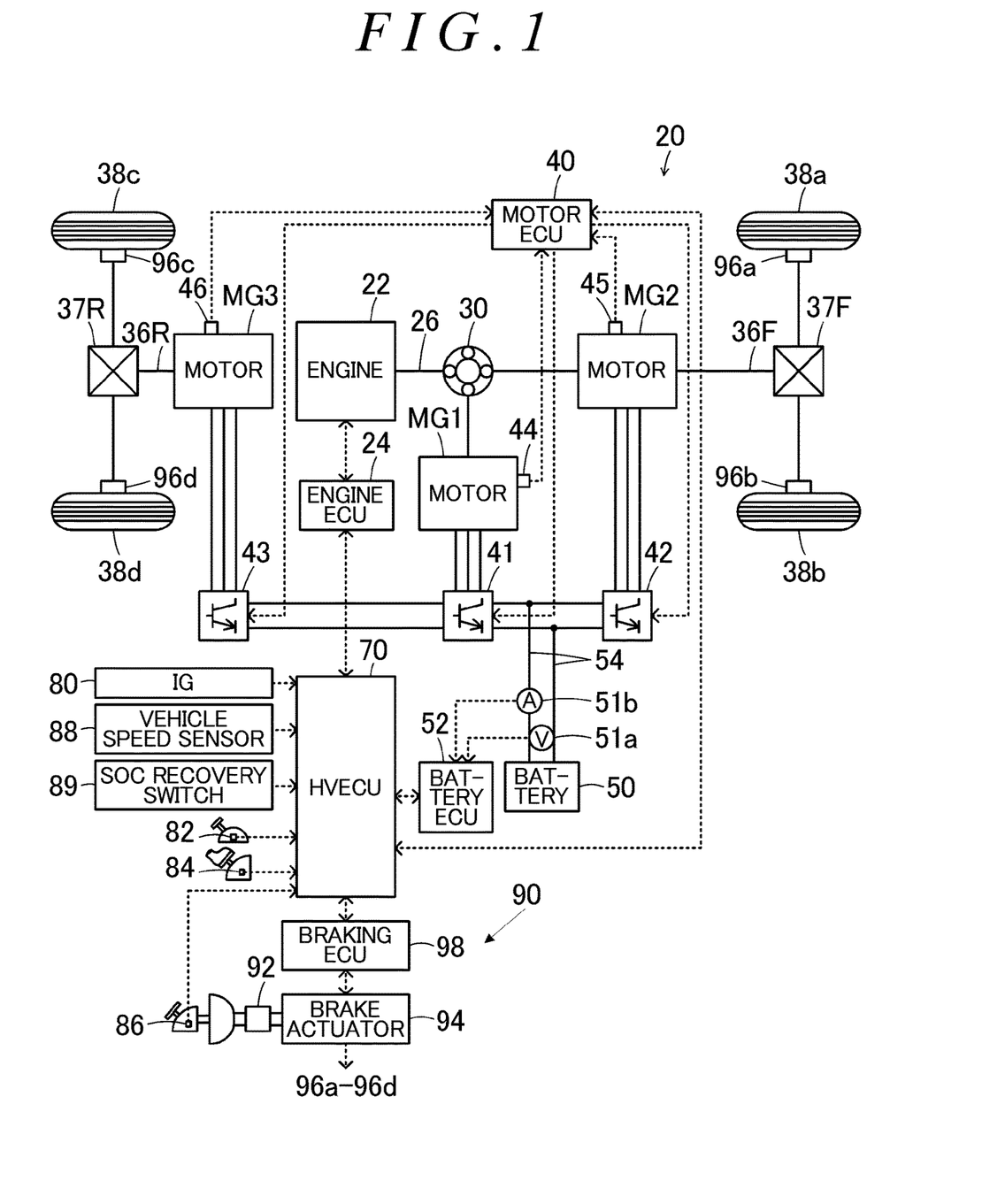
FIG. 1 is a block diagram illustrating an outlined configuration of a vehicle including a traveling motor as an embodiment of the present disclosure.

FIG. 1 is a block diagram illustrating an outlined configuration of a hybrid vehicle 20 as one embodiment of the present disclosure. As illustrated in the drawing, the hybrid vehicle 20 of the embodiment includes an engine 22, a planetary gear set 30, motors MG1, MG2, MG3, inverters 41, 42, 43, a battery 50, an oil hydraulic brake device 90, and a hybrid electronic control unit (hereinafter referred to as "HVECU") 70.

The engine 22 is configured as an internal combustion engine that outputs motive power by using fuel such as gasoline and gas oil. The operation of the engine 22 is controlled by an engine electronic control unit (hereinafter referred to as "engine ECU") 24.

The engine ECU 24 is configured as a microprocessor having a CPU as a main component. The engine ECU 24 includes, in addition to the CPU, a ROM that stores processing programs, a RAM that temporarily stores data, input and output ports, and a communication port. The engine ECU 24 receives, through the input port, input of signals from various sensors required for operation control of the engine 22, the signals including, for example, a crank angle θcr of a crankshaft 26 of the engine 22 from a crank position sensor. The engine ECU 24 outputs various control signals for operation control of the engine 22 through the output port. The engine ECU 24 is connected with the HVECU 70 through the communication port. The engine ECU 24 calculates the number of rotations Ne of the engine 22 based on the crank angle θcr from the crank position sensor.

The planetary gear set 30 is configured as a single pinion planetary gear mechanism. The planetary gear set 30 has a sun gear connected to a rotator of the motor MG1. The planetary gear set 30 has a ring gear connected to a driving shaft 36F coupled with front wheels 38a, 38b through a differential gear 37F. The planetary gear set 30 has a carrier connected to the crankshaft 26 of the engine 22.

The motor MG1, which is configured as a synchronous generator-motor for example, has a rotator connected to the sun gear of the planetary gear set 30 as stated before. The motor MG2, which is configured as a synchronous generator-motor for example, has a rotator connected to the driving shaft 36F. The motor MG3, which is configured as a synchronous generator-motor for example, has a rotator connected to a driving shaft 36R coupled to rear wheels 38c, 38d through a differential gear 37R. The inverters 41, 42, 43, which are used for driving the motors MG1, MG2, MG3, are connected with the battery 50 through the electric power line 54. The motors MG1, MG2, MG3 are rotationally driven when a motor electronic control unit thereinafter referred to as "motor ECU") 40 performs switching control of a plurality of unillustrated switching elements of the inverters 41, 42, 43.

The motor ECU 40 is configured as a microprocessor having a CPU as a main component. The motor ECU 40 includes, in addition to the CPU, a ROM that stores processing programs, a RAM that temporarily stores data, input and output ports, and a communication port. The motor ECU 40 receives, through the input port, input of signals from various sensors required for controlling driving of the motors MG1, MG2, MG3. Examples of the signals include rotational positions θm1, θm2, θm3, of the rotators of the motors MG1, MG2, MG3 from rotational position detection sensors 44, 45, 46. The motor ECU 40 outputs, through the output port, signals such as a switching control signal to a plurality of unillustrated switching elements of the inverters 41, 42, 43. The motor ECU 40 is connected with the HVECU 70 through the communication port. The motor ECU 40 calculates the numbers of rotations Nm1, Nm2, Nm3 of the motors MG1, MG2, MG3, based on the rotational positions θm1, θm2, θm3 of the rotators of the motors MG1, MG2, MG3 from the rotational position detection sensors 44, 45, 46.

The battery 50 is configured as a lithium-ion secondary battery or a nickel-hydrogen secondary battery for example. As described before, the battery 50 is connected with the inverters 41, 42, 43 through the electric power line 54. The battery 50 is managed by a battery electronic control unit (hereinafter referred to as "battery ECU") 52.

The battery ECU 52 is configured as a microprocessor having a CPU as a main component. The battery ECU 52 includes, in addition to the CPU, a ROM that stores processing programs, a RAM that temporarily stores data, input and output ports, and a communication port. The battery ECU 52 receives, through the input port, input of signals from various sensors required to manage the battery 50. Examples of the signals include a voltage Vb of the battery 50 from a voltage sensor 51a, and an electric current Ib (which is positive at the time of being discharged from the battery 50) of the battery 50 from a current sensor 51b. The battery ECU 52 is connected with the HVECU 70 through the communication port. The battery ECU 52 calculates a state of charge SOC based on an integrated value of the battery current Ib from the current sensor 51b. The state of charge SOC refers to a ratio of capacity of electric power dischargeable from the battery 50 to the total capacity of the battery 50.

The oil hydraulic brake device 90 includes brake wheel cylinders 96a, 96b, 96c, 96d attached to the front wheels 38a, 38b or the rear wheels 38e, 38d, and a brake actuator 94. The brake actuator 94 is configured as an actuator configured to apply braking three to the front wheels 38a, 38b or the rear wheels 38c, 38d. The braking force exerted on the vehicle is defined based on pressure (brake pressure) of a master cylinder 92 generated in accordance with stepping-in of the brake pedal and on vehicle speed V. The brake actuator 94 regulates hydraulic pressure of the brake wheel cylinders 96a, 96b, 96c, 96d so that among the braking force, a portion of the braking force corresponding to a share of the oil hydraulic brake device 90 is exerted on the front wheels 38a, 38b or the rear wheels 38e, 38d. The brake actuator 94 regulates the hydraulic pressure of the brake wheel cylinders 96a, 96b, 96c, 96d so that the braking force requested for the oil hydraulic brake device 90 is exerted on the front wheels 38a, 38b or the rear wheels 38e, 38d regardless of the stepping-in of the brake pedal. Hereinafter, the braking force exerted on the front wheels 38a, 38b or the rear wheels 38c, 38d by actuation of the brake actuator 94 is referred to as "hydraulic brake." The brake actuator 94 is drive-controlled by a brake electronic control unit (hereinafter referred to as "braking ECU") 98.

The braking ECU 98 is configured as a microprocessor having a CPU as a main component. The braking ECU 98 includes, in addition to the CPU, a ROM that stores processing programs, a RAM that temporarily stores data, input and output ports, and a communication port. The braking ECU 98 receives, through the input port, input of signals from various sensors required for drive control of the brake actuator 94. The braking ECU 98 outputs, through the output port, signals such as a driving control signal to the brake actuator 94. The braking ECU 98 is connected with the HVECU 70 through the communication port.

The HVECU 70 is configured as a microprocessor having a CPU as a main component. The HVECU 70 includes, in addition to the CPU, a ROM that stores processing programs, a RAM that temporarily stores data, input and output ports, and a communication port. The HVECU 70 receives signals from various sensors through the input port. Examples of the signals input into the HVECU 70 include an ignition signal from an ignition switch 80, and a shift position from a shift position sensor 82. The HVECU 70 also receives signals, such as an accelerator opening Acc from an accelerator pedal position sensor 84, and a brake pedal position BP from a brake pedal position sensor 86. Examples of the signals further include a vehicle speed V from a vehicle speed sensor 88, and a switch signal from an SOC recovery switch 89 issued by a driver to instruct recovery of the state of charge of the battery 50. As described before, the HVECU to is connected with the engine ECU 24, the motor ECU 40, the battery ECU 52, and the braking ECU 98 through the communication port.

The hybrid vehicle 20 of the thus-configured embodiment travels in a hybrid travel (HV travel) mode or an electric travel (EV travel) mode. Here, the HV travel mode is a mode of traveling involving operation of the engine 22. The EV travel mode is a mode of traveling without involving operation of the engine 22.

In the hybrid vehicle 20 of the embodiment, a braking request is made when the brake pedal is stepped-in. At this time, requested braking torque Tp* requested for the vehicle is set based on the brake pedal position BP and the vehicle speed V. The motors MG2, MG3 (inverters 42, 43) and the oil hydraulic brake device 90 are controlled such that the requested braking torque Tp* is exerted on the vehicle. During the control, the engine 22 is idled or stopped. Switching of the plurality of switching elements of the inverter 41 is controlled such that the motor MG1 is driven with a torque command Tm1* that takes a value of zero.

Figure 2:
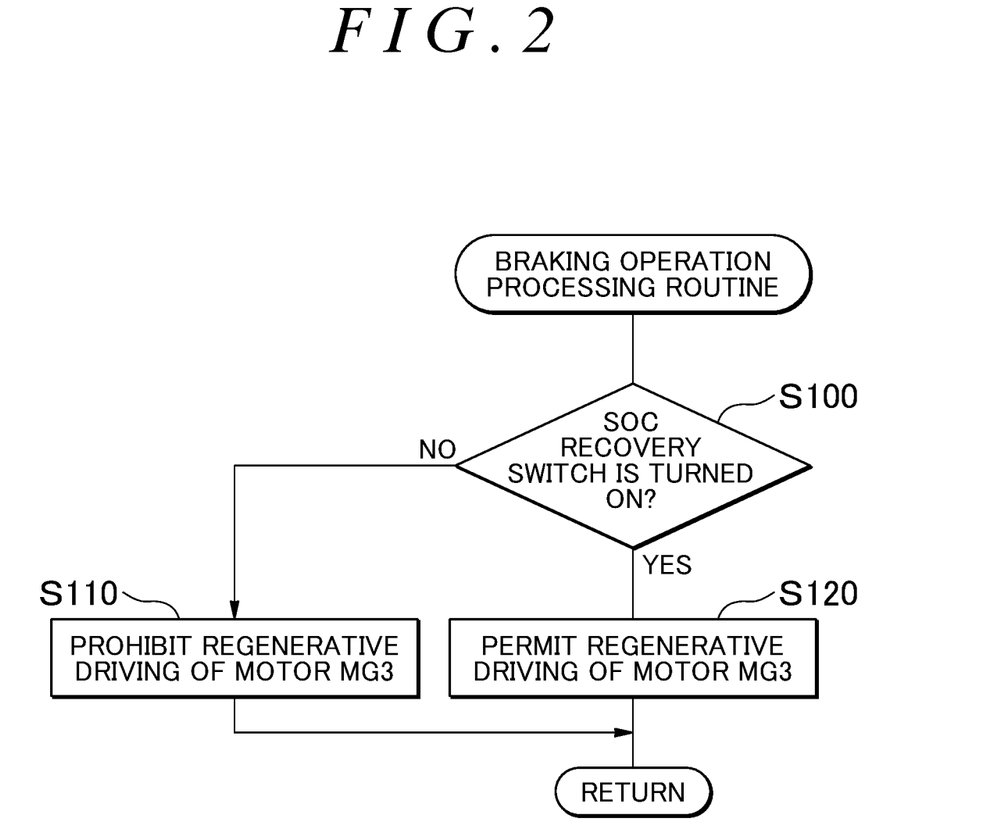
FIG. 2 is a flowchart illustrating one example of a braking operation processing routine executed by a hybrid electronic control unit in the embodiment.

A description is now given of operation of the hybrid vehicle 20 of the thus-configured embodiment, and more particularly, the operation when the brake pedal is stepped in to make a braking request to the vehicle. FIG. 2 is a flowchart illustrating one example of a braking operation processing routine executed by the HVECU 70 in the present embodiment. The routine is executed when a braking request is made to the vehicle.

When the braking operation processing routine is executed, the HVECU 70 first determines whether the SOC recovery switch 89 is turned on or off (step S100). When the SOC recovery switch 89 is turned off, the HVECU 70 prohibits regenerative driving of the motor MG3 (step S110), and ends the present routine. In this case, the HVECU 70 sets a torque command Tm3* of the motor MG3 to a value zero. Then, based on the requested braking torque Tp*, the HVECU 70 sets a torque command Tm2* of the motor MG2 and a torque command Tb* of the oil hydraulic brake device 90. Then, the HVECU 70 transmits the torque command Tm2*, Tm3* of the motors MG2, MG3 to the motor ECU 40, and transmits the torque command Tb* of the oil hydraulic brake device 90 to the braking ECU 98. The motor ECU 40 controls switching of the plurality of switching elements of the inverters 42, 43 such that the motors MG2, MG3 are driven with the torque commands Tm2*, Tm3*. The braking ECU 98 controls the brake actuator 94 such that braking three corresponding to the torque command Tb* is exerted on the vehicle. A distribution ratio between torque exerted on the front wheels 38a, 38b and torque exerted on the rear wheels 38c, 38d, out of the braking torque command Tb*, can properly be set based on parameters, such as deceleration and the brake pedal position BP of the vehicle. When the braking torque command Tb* is a value zero, the braking force by the hydraulic brake is not exerted on the front wheels 38a, 38b nor the rear wheels 38c, 38d.

In this case, relation between the requested braking torque Tp* and the torque commands Tm2*, Tb* is defined in advance and is stored as a switch-off operation map in the ROM, and when a requested braking torque Tp* is given, corresponding torque commands Tm2*, Tb* are derived from the map and are set as the torque command Tm2* of the motor MG2 and the torque command Tb* of the oil hydraulic brake device 90. One example of the switch-off operation map is illustrated in FIG. 3.

Figure 3:
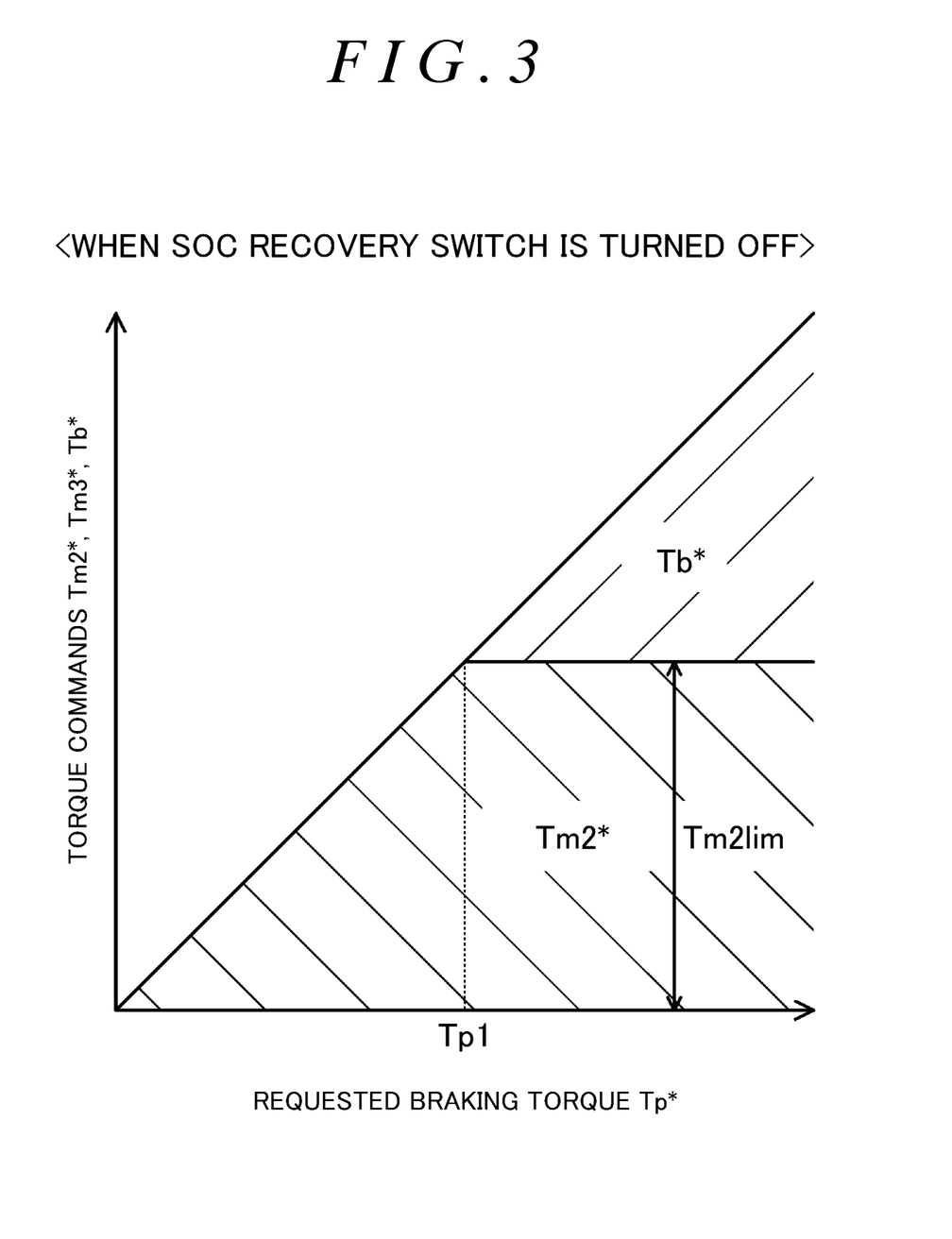
FIG. 3 is an explanatory view illustrating one example of a switch-off operation map in the embodiment.

As is clear from FIG. 3, in a region where the requested braking torque Tp* is larger than a value zero and equal to or less than Tp1, the torque command Tm2* of the motor MG2 is set to a value of the requested braking torque Tp*, and the torque command Tb* of the oil hydraulic brake device 90 is set to a value zero. Here, the value Tp1 represents maximum braking torque exertable on the vehicle from the motor MG2. Since the motor MG2 is directly linked with the driving shaft 36F coupled with the front wheels 38a, 38b in the hybrid vehicle 20, maximum regeneration torque Tm2lim of the motor MG2 can be used as the value Tp1. In a region where the requested braking torque Tp* is larger than the value Tp1, the torque command Tm2* of the motor MG2 is set to a value of the maximum regeneration torque Tm2lim, and the torque command Tb* of the oil hydraulic brake device 90 is set to a torque of a difference between the request braking torque Tp* and the torque command Tm2* (Tm2lim) of the motor MG2. Accordingly, the electric power feedable to the battery 50 can be increased.

In such a hybrid vehicle 20, the motor MG2 that outputs driving force to the front wheels 38a, 38b together with the engine 22 and the motor MG1 is generally used as a main motor, while the motor MG3 is used as a sub motor. In such a case, a motor having a relatively large thermal capacity is often used as the motor MG2, or a cooling device having a relatively high cooling capacity is often used for cooling the motor MG2. A motor having a relatively small thermal capacity is often used as the motor MG3, or a cooling device having a relatively low cooling capacity is often used to cool the motor MG3. Accordingly, when a braking request is made while the motor MG3 is regeneratively driven, the motor MG3 is overheated, and therefore drive restriction is imposed, which may cause a situation where the motor MG3 cannot sufficiently be driven as needed in later time. According to the embodiment, when a braking request is made while the SOC recovery switch 89 is turned off, the motor MG3 is not regeneratively driven. This makes it possible to suppress temperature rise in the motor MG3 and to prevent the motor MG3 from being overheated. As a result, it becomes possible to prevent drive restriction from being imposed on the motor MG 3, so that performance of the motor MG 3 can sufficiently be demonstrated on the occasions when the motor MG 3 needs to be driven, such as when a turn is made and when a slip occurs in later time.

When the SOC recovery switch 89 is turned on in step S100 of FIG. 2, the regenerative driving of the motor MG3 is permitted (step S120), and the present routine is ended. In this case, the HVECU 70 sets the torque commands Tm2*, Tm3* of the motors MG2, MG3, and the torque command Tb* of the oil hydraulic brake device 90 based on the requested braking torque Tp*. Then, the HVECU 70 transmits the torque command Tm2*, Tm3* of the motors MG2, MG3 to the motor ECU 40, and transmits the torque command Tb* of the oil hydraulic brake device 90 to the braking ECU 98. The motor ECU 40 controls switching of the plurality of switching elements of the inverters 42, 43 such that the motors MG2, MG3 are driven with the torque commands Tm2*, Tm3*. The braking ECU 98 controls the brake actuator 94 such that braking force corresponding to the torque command Tb is exerted on the vehicle. A distribution ratio between torque exerted on the front wheels 38a, 38b and torque exerted on the rear wheels 38c, 38d, out of the braking torque command Tb*, can properly be set based on parameters, such as the deceleration and the brake pedal position BP of the vehicle, and a ratio between the torque commands Tm2*, Tm3* of the motors MG1, MG2.

For the torque commands Tm2*, Tm3* of the motors MG2, MG3 and the torque command Tb* of the oil hydraulic brake device 90 in this case, relation between the requested braking torque Tp* and the torque commands Tm2*, Tm3*, Tb* is defined in advance and stored in an unillustrated ROM as a switch-on operation map. When a requested braking torque Tp* is given, corresponding torque commands Tm2*, Tm3*, Tb* are derived and set from the map. One example of the switch-on operation map is illustrated in FIG. 4.

Figure 4:
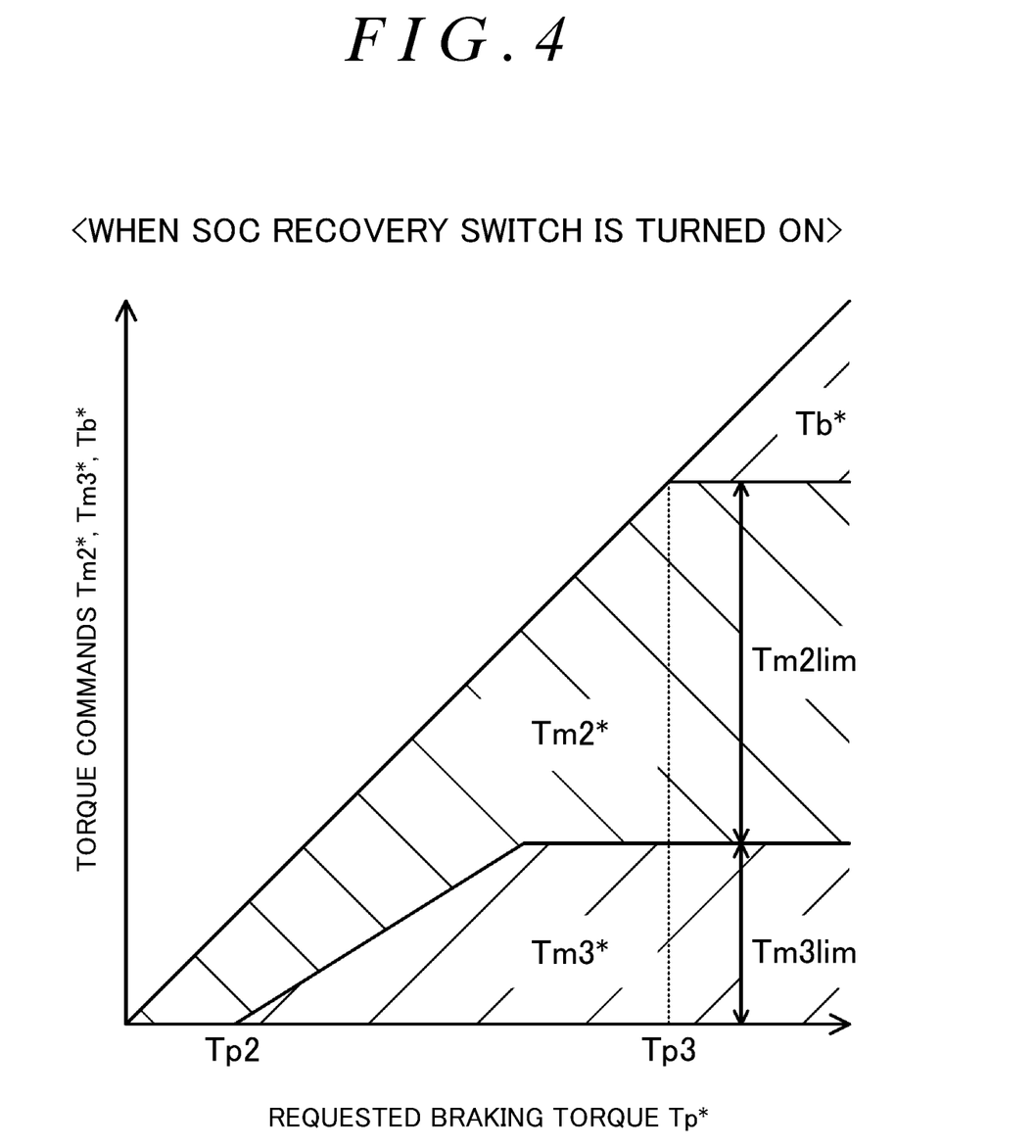
FIG. 4 is an explanatory view illustrating one example of a switch-on operation map in the embodiment.

As is clear from FIG. 4, in a region where the requested braking torque Tp* is larger than a value zero and is equal to or less than a threshold Tp2, the torque command Tm2* of the motor MG2 is set to a value of the requested braking torque Tp*, and the torque command Tm3* of the motor MG3 and the torque command Tb* of the oil hydraulic brake device 90 are set to a value zero. Here, the threshold Tp2 represents an upper limit of a region of the requested braking torque Tp* where a sum of the loss of the motor MG2 and the loss of the motor MG3 when the motor MG3 is not regeneratively driven but the motor MG2 is regeneratively driven is smaller than the loss when the motor MG2 and the motor MG3 are regeneratively driven. A phrase that the sum of the loss of the motor MG2 and the loss of the motor MG3 is minimum signifies that the sum of the loss of the motor MG2 and the loss of the motor MG3 is minimum in the range where the respective motors can be driven. For example, when a drive restriction is imposed on one of the motor MG 2 and the motor MG 3 due to overheating and the like, the above phrase means that the sum of the loss of the motor MG 2 and the loss of the motor MG 3 is minimum within the drive-restricted range. The sum of the loss of the motor MG2 and the loss of the motor MG3 changes in proportion to a square of a torque (current) of the motor MG2 or the motor MG3. In the region where the requested braking torque Tp* is larger than a value zero and is equal to or less than the threshold Tp2, the motor MG3 is not regeneratively driven but the motor MG2 is regeneratively driven to exert the requested braking torque Tp* on the vehicle. By exerting the torque on the vehicle, the sum of the loss of the motor MG2 and the loss of the motor MG3 can be reduced, and thereby energy efficiency of the vehicle can be enhanced as compared with the case of regeneratively driving the motor MG2 and the motor MG3.

In a region where the requested braking torque Tp* is larger than the value Tp2 and equal to or less than a value Tp3, the torque commands Tm2*, Tm3* of the motors MG2, MG3 are so set that the sum of the loss of the motor MG2 and the loss of the motor MG3 is a minimum value larger than a value zero within the range of maximum regeneration torques Tm2lim, Tm3lim of the motors MG2, MG3. The torque command Tb* of the oil hydraulic brake device 90 is set to a value zero. Here, the value Tp3 represents maximum braking torque excitable on the vehicle from the motors MG2, MG3. In the hybrid vehicle 20, the driving shaft 36F coupled with the front wheels 38a, 38b is directly linked with the motor MG2, and the driving shaft 36R coupled with the rear wheels 38c, 38d is directly linked with the motor MG3. Therefore, the torque equal to a sum of the maximum regeneration torques Tm2lim, Tm3lim of the motors MG2, MG3 can be used as the value Tp3. When the motor MG2 and the motor MG3 are regeneratively driven in the region where the requested braking torque Tp* is larger than the value Tp2 and equal to or less than the value Tp3, maximum electric power feedable to the battery 50 can be increased as compared with the case where the motor MG3 is not regeneratively driven. The sum of the loss of the motor MG2 and the loss of the motor MG3 can also be reduced, and thereby energy efficiency of the vehicle can be enhanced. As a result, the state of charge SOC of the battery 50 can be recovered (increased) more. Furthermore, in the embodiment, when the torque commands Tm2*, Tm3* of the motors MG2, MG3 are so set that the sum of the loss of the motor MG2 and the loss of the motor MG3 is minimum, the energy efficiency of the vehicle can further be enhanced.

In a region where the requested braking torque Tp* is larger than the value Tp3, the torque commands Tm2*, Tm3* of the motors MG2, MG3 are set to values of the maximum regeneration torque Tp2lim and Tp3lim, respectively. The torque command Tb* of the oil hydraulic brake device 90 is set to a torque value that is a difference between the requested braking torque Tp* and a value (Tp2lim+Tp3lim). Accordingly, the electric power feedable to the battery 50 can sufficiently be increased.

In the hybrid vehicle 20 in the embodiment described in the foregoing, when a braking request is made while the SOC recovery switch 89 is turned off, the motor MG2, the motor MG3, and the oil hydraulic brake device 90 are controlled such that the requested braking torque Tp* is exerted on the vehicle with regenerative driving of the motor MG2 and without regenerative driving of the motor MG3. Accordingly, temperature rise in the motor MG3 can be suppressed and the motor MG3 can be prevented from being overheated. As a result, it becomes possible to prevent drive restriction from being imposed on the motor MG 3, so that performance of the motor MG 3 can sufficiently be demonstrated on the occasions when the motor MG 3 needs to be driven, such as when a turn is made and when a slip occurs in later time. When a braking request is made while the SOC recovery switch 89 is turned on, the motor MG2, the motor MG3, and the oil hydraulic brake device 90 are controlled such that the motor MG2 and motor MG3 are regeneratively driven to exert the requested braking torque Tp* on the vehicle. Accordingly, as compared with the case where the motor MG3 is not regeneratively driven, the maximum electric power feedable to the battery 50 can be increased. In addition thereto, basically (in the region where the requested braking torque Tp* is larger than the value Tp2 and equal to or less than the value Tp3), the sum of the loss of the MG2 and the loss of the motor MG3 can be reduced and thereby the energy efficiency of the vehicle can be enhanced. As a result, the state of charge SOC of the battery 50 can be recovered (increased) more.

In the hybrid vehicle 20 of the embodiment, when a braking request is made while the SOC recovery switch 89 is turned on, the motor MG2 is regeneratively driven but the motor MG3 is not regeneratively driven in the region where the requested braking torque Tp* is larger than a value zero and equal to or less than the value Tp2. In the region where the requested braking torque Tp* is larger than the value Tp2, the motor MG2 and the motor MG3 are regeneratively driven. However, when a braking request is made while the SOC recovery switch 89 is turned on, the motor MG2 and the motor MG3 may regeneratively be driven irrespective of the requested braking torque Tp*. Even in this case, as compared with the case where the motor MG3 is not regeneratively driven, the maximum electric power feedable to the battery 50 can be increased, and the state of charge SOC of the battery 50 can be recovered (increased) more.

In the hybrid vehicle 20 of the embodiment, when a braking request is made while the SOC recovery switch 89 is turned on, the torque commands Tm2*, Tm3* of the motors MG2, MG3 are so set that the sum of the loss of the motor MG2 and the loss of the motor MG3 is a minimum value larger than a value zero within the range of maximum regeneration torques Tm2lim, Tm3lim of the motors MG2, MG3 if the motor MG2 and the motor MG3 are regeneratively driven. However, the torque commands Tm2*, Tm3* of the motors MG2, MG3 may be set at a fixed distribution ratio with respect to the requested braking torque Tp*, e.g., at a ratio between the maximum regeneration torques Tm2lim, Tm3lim of the motors MG2, MG3.

The hybrid vehicle 20 of the embodiment is configured such that the engine 22, the motor MG1, and the motor MG2 are connected to the driving shaft 36F coupled with the front wheels 38a, 38b, and the motor MG3 is connected to the driving shaft 36R coupled with the rear wheels 38c, 38d. However, the hybrid vehicle 20 may be configured such that the engine 22, the motor MG1, and the motor MG2 are connected to a driving shaft coupled with the rear wheels, and the motor MG3 is connected to a driving shaft coupled with the front wheels.

Figure 5:
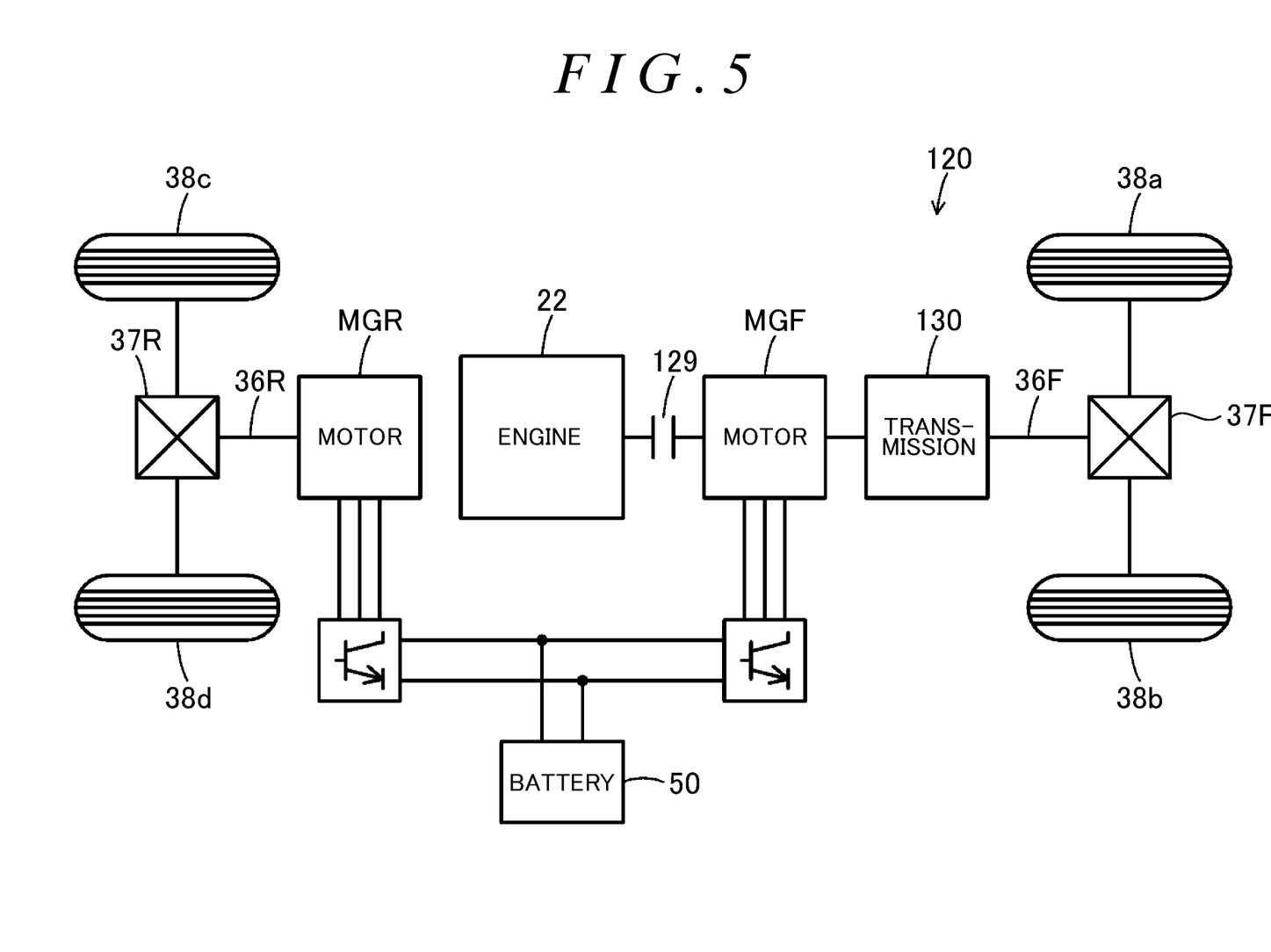
FIG. 5 is a block diagram illustrating an outlined configuration of a hybrid vehicle that is a first modification of the embodiment.
Figure 6:
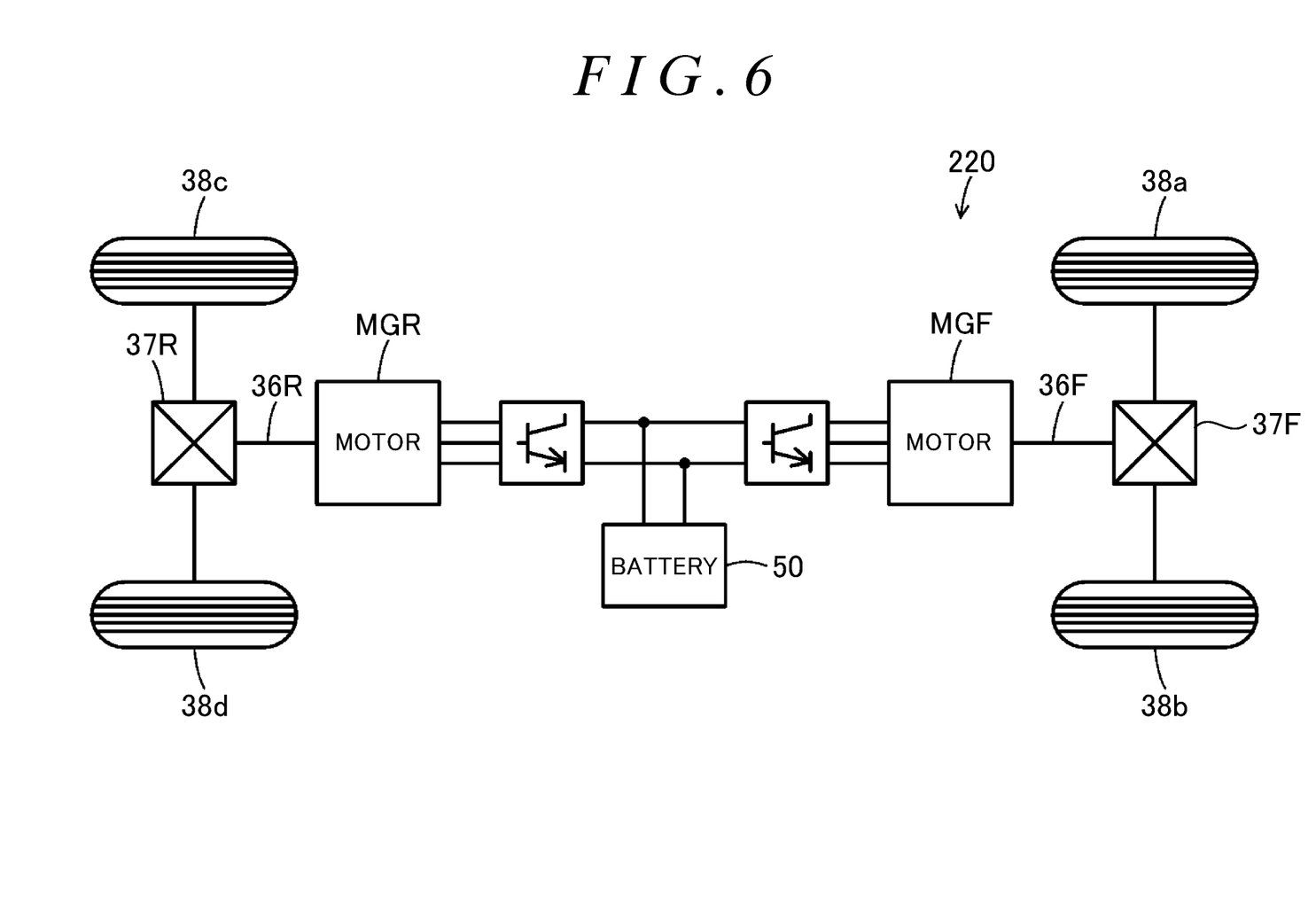
FIG. 6 is a block diagram illustrating an outlined configuration of an electric vehicle as a second modification of the embodiment.

The hybrid vehicle 20 of the embodiment is configured as a hybrid vehicle in which that the engine 22, the motor MG1, and the driving shaft 36F coupled with the front wheels 38a, 38b are connected to the planetary gear set 30, the driving shaft 36F is connected to the motor MG2, and the driving shaft 36R coupled with the rear wheels 38c, 38d is connected to the motor MG3. However, like a hybrid vehicle 120 in a modification illustrated in FIG. 5, the present disclosure may be configured as a hybrid vehicle in which a driving shaft 36F coupled with front wheels 38a, 38b is connected to a motor MGF through a transmission 130, a rotating shaft of the motor MGF is connected to an engine 22 through a clutch 129, and a driving shaft 36R coupled with rear wheels 38c, 38d is connected to a motor MGR. Like an electric vehicle 220 in a modification illustrated in FIG. 6, the present disclosure may be configured as an electric vehicle in which a driving shaft 36F coupled with front wheels 38a, 38b is connected to a motor MGF and a driving shaft 36R coupled with rear wheels 38c, 38d is connected to a motor MGR.

A description is given of correspondence relation between main elements of the embodiment and main elements of the present disclosure described in the Summary. In embodiment, the motor MG2 is one example of "the first motor" of the present disclosure. The motor MG3 is one example of "the second motor." The battery 50 is one example of "the battery." The oil hydraulic brake device 90 is one example of "the braking force applying unit." The SOC recovery switch 89 is one example of "the instruction switch." The HVECU 70, the motor ECU 40, and the braking ECU 98 are one example of "control means."

Since the correspondence relation between the main elements of the embodiment and the main elements of the present disclosure described in the Summary disclosure is one example to provide a specific description of the mode for carrying out the present disclosure described in the Summary, the correspondence relation is not intended to limit the elements of the present disclosure described in the Summary. More specifically, the present disclosure disclosed in the Summary should be interpreted based on the description therein, and the embodiment is merely a specific example of the present disclosure disclosed in the Summary.

Although the mode for carrying out the present disclosure has been described using the embodiment, the present disclosure is not limited in any manner to the embodiment disclosed. It should naturally be understood that the present disclosure can be carried out in various modes without departing from the scope of the present disclosure.

The present disclosure is applicable in the fields such as manufacturing of the vehicle.

What is claimed is:

1. A vehicle, comprising:
   a first motor connected to one of front wheels and rear wheels;
   a second motor having a thermal capacity smaller than a thermal capacity of the first motor and connected to an other of the front wheels and the rear wheels;
   a battery configured to exchange electric power with the first motor and the second motor;
   a braking force applying unit configured to apply braking force to the vehicle;
   an instruction switch configured to instruct recovery of a state of charge of the battery; and
   an electronic control unit configured to:
   (i) control the first motor, the second motor, and the braking force applying unit such that requested braking force corresponding to a braking request is exerted on the vehicle, when the braking request is made in the vehicle,
   (ii) execute control such that the first motor is regeneratively driven while the second motor is not regeneratively driven, when the braking request is made while the instruction switch is turned off, and
   (iii) execute control such that the first motor and the second motor are regeneratively driven, when the braking request is made while the instruction switch is turned on.

2. The vehicle according to claim 1, wherein
the electronic control unit is configured to execute control such that a sum of a loss of the first motor and a loss of the second motor is minimum when the braking request is made while the instruction switch is turned on.

3. The vehicle according to claim 1, wherein
the electronic control unit is configured to:
(i) execute control such that the requested braking force is exerted on the vehicle from the first motor when the requested braking force is equal to or less than a first maximum braking force exertable on the vehicle from the first motor and the braking request is made while the instruction switch is turned off,
(ii) execute control such that the first maximum braking force is exerted on the vehicle from the first motor and that braking force of a difference between the requested braking force and the first maximum braking force is exerted on the vehicle from the braking force applying unit when the requested braking force is larger than the first maximum braking force and the braking request is made while the instruction switch is turned off,
(iii) execute control such that the requested braking force is exerted on the vehicle from the first motor and the second motor when the requested braking force is equal to or less than a second maximum braking force that is exertable on the vehicle from the first motor and the second motor and the braking request is made while the instruction switch is turned on, and
(iv) execute control such that the second maximum braking force is exerted on the vehicle from the first motor and the second motor and that braking force of a difference between the requested braking force and the second maximum braking force is exerted on the vehicle from the braking force applying unit when the requested braking force is larger than the second maximum braking force and the braking request is made while the instruction switch is turned on.

4. The vehicle according to claim 1, wherein
the electronic control unit is configured to,
execute control such that the first motor is regeneratively driven while the second motor is not regeneratively driven when the braking request is made while the instruction switch is turned on and a sum of a loss of the first motor and a loss of the second motor when only the first motor is regeneratively driven is smaller than the sum when the first motor and the second motor are regeneratively driven.

* * * * *

UNITED STATES PATENT AND TRADEMARK OFFICE
CERTIFICATE OF CORRECTION

PATENT NO. : 10,611,362 B2  
APPLICATION NO. : 15/444643  
DATED : April 7, 2020  
INVENTOR(S) : Masaya Yamamoto Page 1 of 1

It is certified that error appears in the above-identified patent and that said Letters Patent is hereby corrected as shown below:

On the Title Page

Item (72), address, delete "Owariasahi" and insert --Owariasahi-shi Achi-Ken--, therefor.

In the Specification

Column 1, Line 37, after "power", delete "front" and insert --from--, therefor.

Column 4, Line 64, delete "thereinafter" and insert --(hereinafter--, therefor.

Column 5, Line 48, delete "38e" and insert --38c--, therefor.

Column 5, Line 50, delete "three" and insert --force--, therefor.

Column 5, Line 59, delete "38e" and insert --38c--, therefor.

Column 5, Line 63, delete "38e" and insert --38c--, therefor.

Column 6, Line 30, delete "HVECU to" and insert --HVECU 70--, therefor.

Column 7, Line 9, delete "three" and insert --force--, therefor.

Column 8, Line 1, after "drive" delete --,--.

Column 8, Line 21, delete "Tb" and insert --Tb*--, therefor.

Column 9, Line 14, delete "excitable" and insert --exertable--, therefor.

Signed and Sealed this  
Nineteenth Day of May, 2020

Andrei Iancu  
*Director of the United States Patent and Trademark Office*